Figure 1:
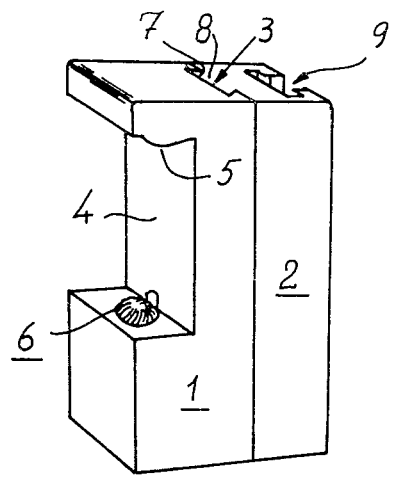

United States Patent [19]

Svensson

[11] Patent Number: 4,460,141

[45] Date of Patent: Jul. 17, 1984

[54] SELF-LOCKING SUPPORT CLAMP FOR MOUNTING ITEMS ON A SUPPORT BAR

[75] Inventor: Conny Svensson, Oskarshamn, Sweden

[73] Assignee: Elajo Invest Aktiebolag, Oskarshamn, Sweden

[21] Appl. No.: 309,057

[22] Filed: Oct. 6, 1981

[51] Int. Cl.³ .............................................. E04G 3/00
[52] U.S. Cl. ................................................. 248/222.1
[58] Field of Search .............. 248/222.1, 216.4, 217.1, 248/220.2, 412, 411, 407, 408, 409, 221.3, 307, 214, 215, 246, 297.5

[56] References Cited

U.S. PATENT DOCUMENTS

| 720,549 | 2/1903 | Adler | 248/412 |
|---|---|---|---|
| 1,246,749 | 11/1917 | Joiner | 248/221.3 |
| 2,562,318 | 7/1951 | Lewis | 248/214 |
| 2,703,691 | 3/1955 | Minnis | 248/412 |
| 3,132,832 | 5/1964 | Kore | 248/307 |
| 3,664,627 | 5/1972 | Sykes et al. | 248/246 |
| 4,223,863 | 9/1980 | Birman | 248/246 |

Primary Examiner—William H. Schultz
Assistant Examiner—Ramon O. Ramirez
Attorney, Agent, or Firm—Larson and Taylor

[57] ABSTRACT

A support clamp for releasably mounting items on a support bar (19), comprising a locking body (1) and a support body (2) which under a mutual locking engagement are movable vertically in relation to each other and between which there is a locking means comprising a locking ball (13) which is vertically displacable in a guide bore (15) and an actuation ball (14) which co-operates with the locking ball (4) and which is horizontally movable in a guide bore (16) communicating with the guide bore (15) of the locking ball (13), and in which the actuation ball (14) is arranged to be actuated to a displacement in the guide bore (16) by an actuation groove (17, 18) in the support body (2), whereby the locking ball (13) when moving the support body (2) upwards in relation to the locking body (1) slides down in its guide bore (15) thereby releasing the support clamp, whereas the locking ball (13) when moving the support body (2) down in relation to the locking body (1) is forced upwards and partly out of the guide bore (15) actuated by the actuation ball (14) into a locking engagement with the lower surface of a support bar (19) or similar means. For this purpose the locking body (1) is formed with a horizontal through groove (4) which at the upper surface is formed as a locking bulge (5) adapted to be mounted in a corresponding portion (23; 23'; 23'') of the locking bar (19) whereas the groove (4) at the lower surface supports the ball locking means (13).

9 Claims, 10 Drawing Figures

SELF-LOCKING SUPPORT CLAMP FOR MOUNTING ITEMS ON A SUPPORT BAR

The present invention generally relates to a support clamp for releasably mounting items on a vertical surface like a wall or a similar structure, and the invention more specifically relates to such a support clamp for releasably mounting of items such as tools, instruments, equipments, etc. on a bracket, a bar or a similar apparatus which is fixedly mounted on a wall. The invention has been developed among other things for mounting items of equipment etc. within the medical care field. It is, however, to be understood that the said field is only one of many possible fields of use for the invention.

For the mounting of instruments and equipment etc. within the medical care field it is known to attach a bar, a so called intensive care bar, around the walls of a room, and on the said bar the instruments or the equipment etc. may be mounted in close proximity to the patient or at any other place where the equipment is needed. For this purpose so called support clamps generally are used, which can be mounted on the intensive care bar and the clamps in turn support the equipment. Often there is a desire that the equipment might be moved along the bar without dismounting of the equipment and without releasing the equipment from the support clamp. This may cause special problems in cases where several support clamps are used for different parts of the equipments co-related to each other. There are known several different systems of support bars each system necessitating a special type of support clamp. On the market there are also several so called universal support clamps which after some readjustment can be brought to adapt several different support bar systems. The readjusting for adapting the clamps to the different support bar systems, however, may be complicated and time consuming and therefore there has been a need for a simple and easily readjustable support clamp.

It is very important that the instruments or the equipment etc. are mounted very steadily on the wall support bars, so that there is no risk that the equipment is let free or falls to the floor. Therefore most of the available support clamps are formed with some type of locking mechanism for securing the support clamp and thereby the equipment to the support bar. The locking mechanisms can be locking screws which when being tightened secure the support clamp to the bar, or they may be formed as expandable locking means having the same function. Such previously known locking means do not fullfil the high demands on safety in that there is a risk that the attendant person forgets to lock the support clamp to the bar, and also there is a risk that the equipment becomes loose when moving the equipment since it is necessary to release the locking means by one hand and to maintain and move equipment by the other hand. When using two or several support clamps for mounting of different co-related or co-operatable-related or co-operatable pieces of equipment which must be moved concurrently there is often a need of several colaborating persons.

Consequently there is a need for a support clamp for mounting of different items on a fixed wall bar or similar apparatus, which support clamp is formed so that the equipment can be quickly and safely moved while the equipment is maintained with both hands or in which the equipment in case of a double or twin mounting can be moved by one single person.

The invention therefore aims to provide a support clamp which fits most available bar systems, which support clamp is selflocking thereby eliminating the risk that the attendant person forgets to lock the clamp and thereby the equipment to the wall bar.

According to the present invention there is provided a support clamp for releasably mounting items on a support bar which is fixedly mounted on a vertical surface, the support clamp comprising a locking body which can be engaged with and locked to a said support bar, a support body which cooperates with the locking body and which is displacable upwards and downwards in relation to the locking body, and between the locking body and the support body a locking means which is actuated so that the locking body can be released from the support bar when the support body is moved upwards in relation to the locking body and is locked when the support body is moved down in relation to the locking body.

The securing force of the clamp to the bar increases proportionally to an increasing load on the support clamp, in other words in direct relation to the weight of the equipment. The support clamp is also formed so that it is automatically released from the support bar when the equipment is moved upwards and is automatically locked and secured to the bar when being loaded in the downward direction.

Figure 2:
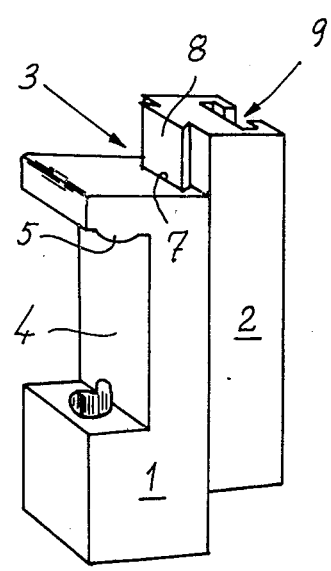
Figures 3A, 3B, 3C, 3D:
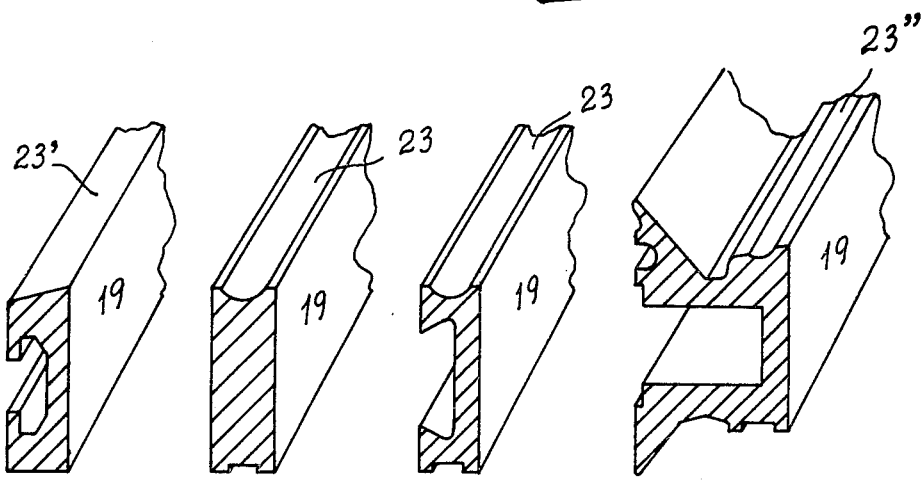
Figure 4:
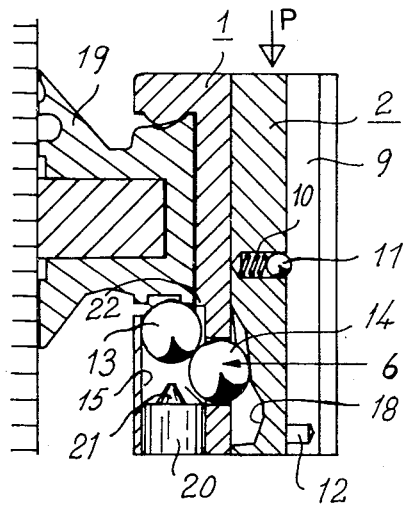
Figure 5:
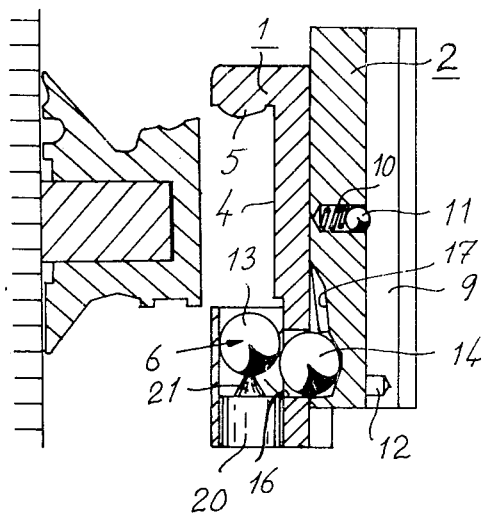
Figure 6:
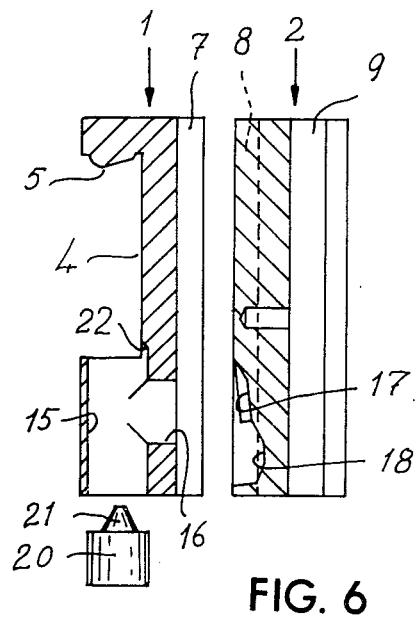
Figure 7:
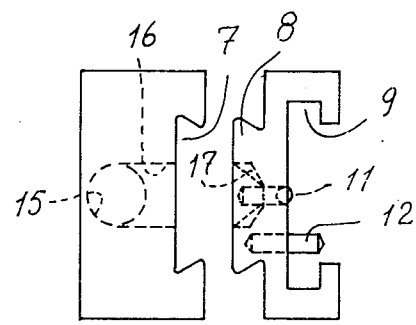

An embodiment of the invention will now be described, by way of an example, with reference to the accompanying drawings, in which:

FIG. 1 diagrammatically and in a perspective view shows a support clamp according to the invention in the locking condition, FIG. 2 shows the support clamp of FIG. 1 in a released condition, FIGS. 3A–3D diagrammatically show cross-sections of different types of support bars with which the support clamp according to the invention can be used, FIG. 4 is a vertical cross-section of a support clamp according to the invention mounted and locked on a support bar fixed mounted on a wall, FIG. 5 shows the support clamp of FIG. 4 in its released condition, FIG. 6 shows the main parts of the support clamp according to the invention except for the ball locking means in an exploded view, and FIG. 7 is a plan view of the support clamp.

The support clamp illustrated in FIGS. 1 and 2 generally comprises a locking body 1 and a mounting body 2 which are interconnected for relative vertical displacement by means of a dovetail joint 3 or any other suitable displacable joint.

The locking body 1 is provided with a through horizontal three sided groove 4 which at the upper side has a central locking bulge 5 and at the bottom side a ball locking means 6 as will be further described hereafter. At the rear side the locking body 1 has a female dovetail groove 7 cooperating with a corresponding male dovetail 8 provided on the support body 2. The support body 2 is further provided with a substantially T-shaped groove 9 in which items such as tools, instruments, equipment, etc. can be mounted. For securing such items the T-shaped groove 9 has a locking ball 11 which is biased by a spring 10, and at or adjacent the bottom the T-shaped groove there is provided a stop pin 12.

As most clearly evident from FIGS. 4 and 5 the ball locking means 6 comprises two balls, viz. a locking ball 13 and an actuation ball 14 which take different positions when moving the support body 2 upwards or downwards respectively in relation to the locking body 1. For the connection of the locking balls the locking body 1 is formed with a vertical cylindrical guide bore 15 for the locking ball 13 and a horizontal guide bore 16 for the actuation ball 14. The guide bores 15 and 16 communicate with each other. For the actuation of the actuation ball 14 and thereby the locking ball 13 the support body 2 has a downwardly conically widened actuation groove 17 at the side of the support body 2 facing the locking body 1. At the bottom the actuation groove 17 is ended by a segment of a sphere 18 formed so that it partly can enclose the actuation ball 14. The actuation groove 17 and the sphere segment 18 are provided at such place along the support body 2 that the locking body 1 and the support body 2 in their locking positions normally are positioned on the same vertical level, whereas a raising of the support body 2 in relation to the locking body 1 causes the actuation ball 14 to slide into the sphere segment 18 and causes the locking ball 13 to drop some distance down in the guide bore 15. The sphere segment 18 is of such depth that the locking ball 13 in the assembly clamp may pass the actuation ball 14. At the bottom the guide bore 15 for the locking ball 13 is blocked by a plug 20 which has an upper conical top 21 supporting the locking ball 13 in its lowermost position on such a level that the centre of the locking ball 13 is always higher than the centre of the actuation ball 14. Thereby the locking ball 13 does not prevent a side movement of the actuation ball 14 when moving the support body 2 down from its upper position of FIG. 5 to its lower position as shown in FIG. 4. For preventing the locking ball 13 from moving out of the guide bore 15 the rear side of the groove 4 is formed with a shoulder 22.

The mounting of the support clamp is made by moving the support body 2 upwards in relation to the locking body 1 to the position illustrated in FIG. 2, whereby the actuation ball 14 slides into the sphere segment 18 and the locking ball 13 moves down in its guide bore 15 to a position clear of the groove 4 of the locking body 1. Thereby the locking body can via the locking bulge 5 be hinged on a corresponding groove 23, or a corresponding surface 23' or an inclined surface 23" of the locking bar 19, whereupon the entire support clamp is rotated to a position in contact with the support bar 19. When the support body 22 is thereafter moved down in relation to the locking body 1, for instance depending on a load P from an instrument, some equipment or similar apparatus the actual ball 14 is forced into the horizontal guide bore 16 by the actuation groove 17. Since the actuation ball 14 is always located on a lower level than the locking ball 13 the said locking ball 13 is forced upwards into locking engagement with the lower surface of the support bar 19, for instance by co-operation with a groove 24 similar to the groove 23. As long as the load P is maintained the support clamp is kept locked to the bar 19, but when the support body 2 is moved upwards the locking engagement is simply and automatically released. By the form of the apparatus a stronger locking is obtained the stronger the support body 2 is loaded in the direction downwards, and therefore there is no risk that the support clamp becomes loosened from the bar 19 depending on a two strong a load P. Due to the automatic locking and the automatic release of the support clamp any equipment mounted in the T-shaped groove 9 of the support body 2 can be moved together with the support clamp whereby both hands can be used for holding the equipment since the locking ceases as soon as the equipment or the support body is lifted upwards.

It is to be understood that the embodiment of the invention described above and illustrated in the drawings is only one illustrative example and that many different modifications may be made within the scoper of the appended claims.

I claim:

1. A support claim for releasably mounting items on a support bar which is fixedly mounted on a vertical surface, the support clamp comprising a locking body which can be engaged with and locked to a said support bar, a support body which co-operates with the locking body and which is displaceable linearly upwards and downwards in relation to the locking body, and between the locking body and the support body a locking means which is actuated so that the locking body can be released from the support bar when the support body is moved upwards in relation to the locking body and is locked when the support body is moved down in relation to the locking body.

2. A support clamp as claimed in claim 1, in which the locking means comprises a locking ball which is movable upwards and downwards in a vertical guide bore and which upon a movement upwards and downwards of the support in relation to the locking body is correspondingly moved downwards and upwards respectively in the guide bore.

3. A support clamp as claimed in claim 2, in that the locking means includes an actuation ball which co-operates with an actuates the locking ball and which is horizontally movable in a guide bore and is actuated to move in the horizontal direction by a downwardly extending conically widened actuation groove in the support body.

4. A support clamp according to claim 3, in which the actuation groove of the support body at the bottom is ended by a segment of a sphere adapted to partly enclose the actuation ball.

5. A support clamp as claimed in claim 3 or claim 4, in which the two balls with a slight fit are movable in their respective guide bores, and the actuation groove and the sphere segment are of such depth that the locking ball can be moved past the actuation ball when the actuation ball is located in the sphere segment.

6. A support clamp as claimed in any of claims 2 to 4, in which the guide bore for the locking ball is blocked at the bottom by a plug having a conical top preventing the locking ball from being lowered to deeply in the guide bore and so that the centre of the locking ball when the plug is inserted in the guide bore is always on a higher level than the centre of the actuation ball.

7. A support clamp as claimed in any of claims 2 to 4 in which the locking body is provided with a horizontal three sided through groove the upper horizontal part of which has a locking bulge for being mounted on a portion of a support bar, and the locking ball is provided at the lower horizontal surface of the groove and engages the lower side of the support bar.

8. A support clamp as claimed in claim 7, in which the horizontal through groove of the locking body is provided with a shoulder for preventing the locking ball from sliding out of its guide bore.

9. A support clamp as claimed in any of claims 2 to 4, in which the locking body at the side thereof opposing the support body has a T-shaped groove with a ball locking means and a bottom stop pin for receiving and locking of an item to the support body.

* * * * *